US010577091B2

(12) United States Patent
Parks et al.

(10) Patent No.: US 10,577,091 B2
(45) Date of Patent: Mar. 3, 2020

(54) VERTICAL TAKE-OFF AND LANDING AIRCRAFT

(71) Applicant: AFS-DV VTOL Technologies Corporation, Manassas, VA (US)

(72) Inventors: Robert W. Parks, San Jose, CA (US); Francesco Giannini, Falls Church, VA (US); Diana Siegel, Manassas, VA (US); Jan D. Lienhard, Manhattan Beach, CA (US)

(73) Assignee: BCG Digital Ventures GmbH, Berlin (DE)

( * ) Notice: Subject to any disclaimer, the term of this patent is extended or adjusted under 35 U.S.C. 154(b) by 353 days.

(21) Appl. No.: 15/494,780

(22) Filed: Apr. 24, 2017

(65) Prior Publication Data
US 2018/0305005 A1    Oct. 25, 2018

(51) Int. Cl.
*B64C 27/26* (2006.01)
*B64C 27/30* (2006.01)
(Continued)

(52) U.S. Cl.
CPC ............. *B64C 27/26* (2013.01); *B64C 27/30* (2013.01); *B64C 29/0025* (2013.01);
(Continued)

(58) Field of Classification Search
CPC ......... B64C 27/30; B64C 27/24; B64C 27/26; B64C 29/0025
See application file for complete search history.

(56) References Cited

U.S. PATENT DOCUMENTS

| 3,260,476 A | 7/1996 | James |
| 6,293,491 B1 * | 9/2001 | Wobben ................. B64C 27/00 244/17.23 |

(Continued)

FOREIGN PATENT DOCUMENTS

| DE | 19745492 | 4/1999 |
| DE | 10241732 | 3/2004 |

(Continued)

OTHER PUBLICATIONS

Ehang 184 autonomous aerial vehicle specs, downloaded from http://www.ehang.com/ehang184/specs/ on Apr. 15, 2017.
(Continued)

*Primary Examiner* — Philip J Bonzell
*Assistant Examiner* — Tye William Abell
(74) *Attorney, Agent, or Firm* — DLA Piper LLP (US)

(57) ABSTRACT

Disclosed herein is a vertical take-off and landing (VTOL) aircraft having three lifting surfaces and separate lift and cruise systems. The VTOL aircraft may include a fuselage having a roll axis, a thrust rotor to produce a propulsion thrust, first and second rotor booms, first and second canard surfaces, first and second wing surfaces, first and second tail surfaces, and a plurality of lift rotors to produce a lifting thrust force. The plurality of lift rotors includes a first plurality of lift rotors positioned on the first rotor boom and a second plurality of lift rotors positioned on the second rotor boom. The first and second rotor booms may be substantially parallel to the roll axis of the fuselage, where the fuselage is positioned between the first and second rotor booms. Each of the first and second rotor booms may be secured to the aircraft at three locations.

23 Claims, 11 Drawing Sheets

(51) Int. Cl.
*B64C 39/12* (2006.01)
*B64D 27/24* (2006.01)
*B64C 29/00* (2006.01)
*B64C 39/08* (2006.01)

(52) U.S. Cl.
CPC .............. *B64C 39/08* (2013.01); *B64C 39/12* (2013.01); *B64D 27/24* (2013.01)

(56) References Cited

U.S. PATENT DOCUMENTS

| | | | |
|---|---|---|---|
| 7,857,254 B2 | 12/2010 | Parks | |
| 8,393,564 B2 | 3/2013 | Kroo | |
| 2004/0195433 A1* | 10/2004 | Kayama | B64C 27/24 244/10 |
| 2013/0020429 A1 | 1/2013 | Kroo | |
| 2013/0062455 A1 | 3/2013 | Lugg et al. | |
| 2015/0136897 A1 | 5/2015 | Seibel | |
| 2016/0144956 A1 | 5/2016 | Parks | |
| 2016/0207625 A1* | 7/2016 | Judas | B64C 29/0025 |
| 2016/0236774 A1 | 8/2016 | Niedzballa | |
| 2017/0300065 A1* | 10/2017 | Douglas | G05D 1/0676 |

FOREIGN PATENT DOCUMENTS

| | | |
|---|---|---|
| DE | 102012104783 | 12/2013 |
| FR | 966032 | 9/1950 |
| KR | 1020120060590 | 6/2012 |
| WO | WO2006113877 | 10/2006 |

OTHER PUBLICATIONS

Lyasoff, Rodin, Welcome to Vahana, Sep. 23, 2016, dowlnoaded from https://vahana.aero/welcometovahanaedfa689f2b75 on Apr. 15, 2017.

* cited by examiner

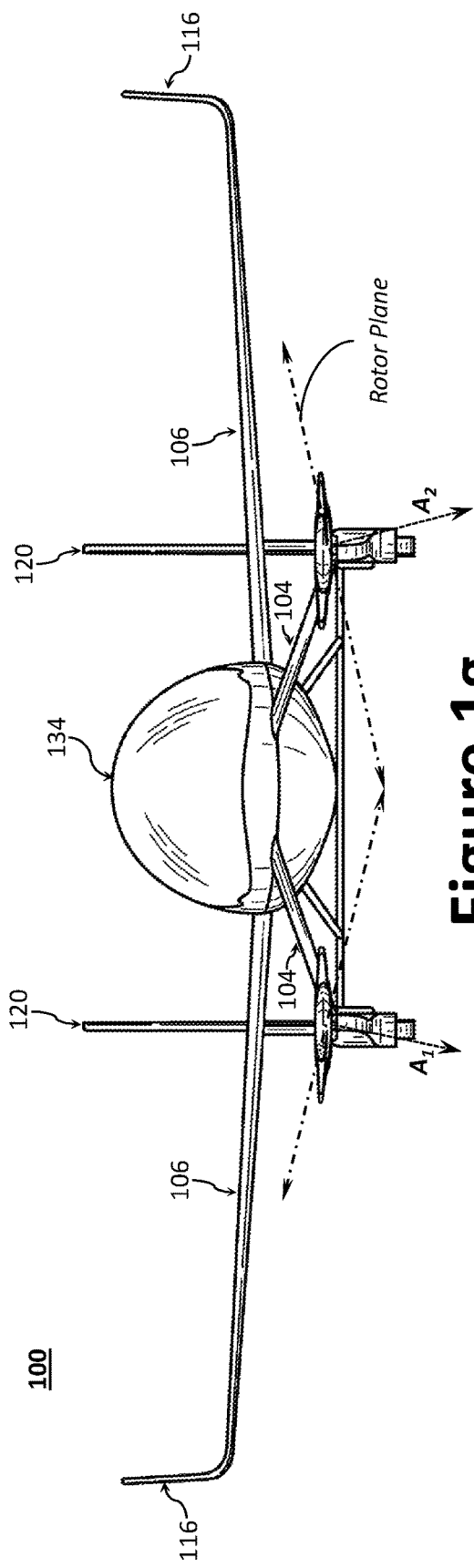
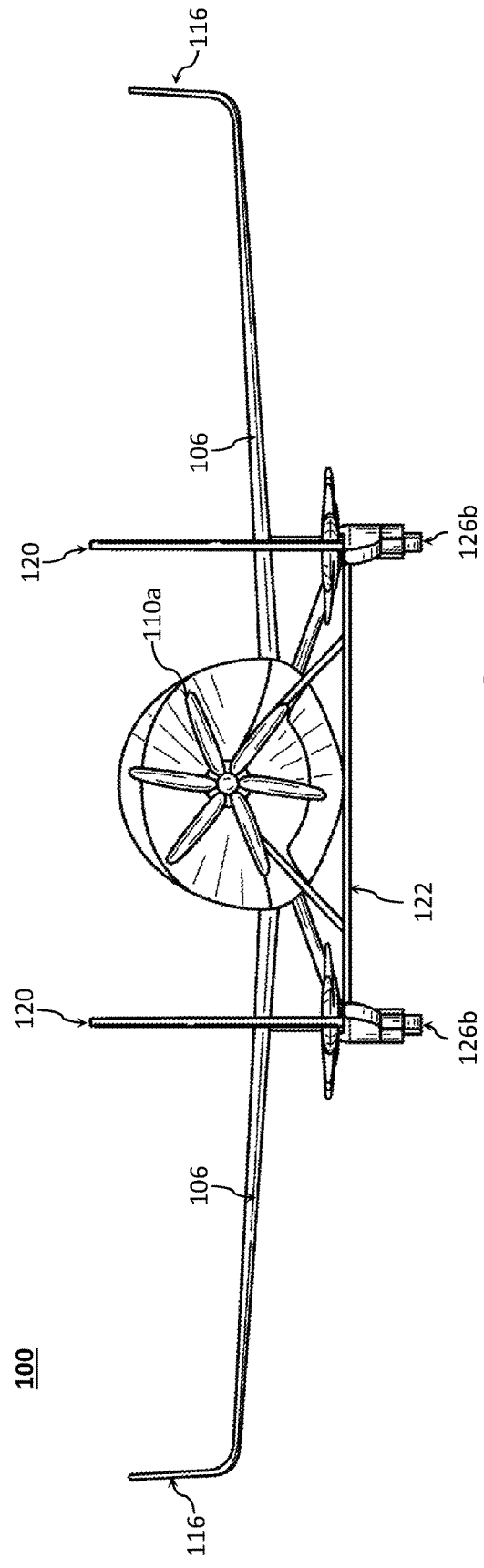

VERTICAL TAKE-OFF AND LANDING AIRCRAFT

TECHNICAL FIELD

The present invention relates to a vertical take-off and landing (VTOL) aircraft, more specifically, to a VTOL aircraft with significant range, even more specifically to a VTOL aircraft having three lifting surfaces and separate lift and propulsion systems.

BACKGROUND

VTOL aircraft typically fall into one of three different propulsion system categories. The first category employs a joined lift-plus-cruise propulsion system, which suffers from limited range due to inefficiencies in producing powered lift. A second category employs a tilting mechanism to turn (redirect) the force produced by the rotors from lift to cruise thrust once at a predetermined altitude. This concept, however, relies on a complex tilting mechanism that is heavy, introduces a failure path, and is costly to build and maintain.

A third category employs a series of rotors, each of which is individually dedicated to either lift or cruise thrust, where the lift rotors are only active during vertical takeoff and landing and the cruise rotor(s) are only active during the cruise portion of flight. For example, U.S. Pat. No. 8,393,564 B2 to Kroo, tilted "Personal Aircraft," describes an aircraft configuration that uses a combination of multiple vertical lift rotors, tandem wings, and forward thrust propellers. In addition, U.S. Pat. Pub. No. 2016/0236774 to Hans Niedzballa, titled "Aircraft Capable of Vertical Take-off," describes an aircraft with a bearing structure having a central fuselage and two pylons each situated at a distance laterally from the fuselage. Attached to the bearing structure of the aircraft are hub rotors to provide an upward drive force acting in the vertical direction, and a thrust drive to provide thrust force acting in the horizontal direction.

Existing VTOL aircraft, such as the VTOL aircraft described by Niedzballa, suffers from a number of limitations. For example, significant vibration during transition flight is generated when a single attachment point is used between each rotor boom and the fuselage. In addition, constraining the rotor blades to the dimensions of the pylon imposes limitations on the number of rotors that may be employed in a given aircraft. Finally, in addition to added weight, cost, and complexity, stowing rotors within the rotor booms behind a closeable door does not appreciably reduce drag, can increase noise dramatically, and decreases rotor efficiency.

In view of the foregoing, a need exist for a VTOL aircraft with significant range, decreased noise, and increased efficiency.

SUMMARY OF THE INVENTION

The present invention is directed to a VTOL aircraft with significant range, decreased noise, and increased efficiency.

According to one aspect, a vertical take-off and landing (VTOL) aircraft comprises: a fuselage having a roll axis; a thrust rotor to produce a propulsion thrust; first and second rotor booms, wherein the first and second rotor booms are substantially parallel to the roll axis of the fuselage, and the fuselage is positioned between the first and second rotor booms; first and second canard surfaces, each of said first and second canard surfaces having a canard proximal end and a canard distal end, wherein the canard proximal end of the first canard surface is coupled to the fuselage and the canard distal end of the first canard surface is coupled to the first rotor boom, wherein the canard proximal end of the second canard surface is coupled to the fuselage and the canard distal end of the second canard surface is coupled to the second rotor boom; first and second wing surfaces, each of said first and second wing surfaces having a wing proximal end and a wing distal end, wherein the wing proximal end of each of the first wing surface and second wing surface is coupled to the fuselage, wherein the first wing surface is coupled to the first rotor boom and the second wing surface is coupled to the second rotor boom; first and second tail surfaces, each of said first and second tail surfaces having a tail proximal end and a tail distal end, wherein the tail proximal end of the first tail surface is coupled to the fuselage and the tail distal end of the first tail surface is coupled to the first rotor boom, wherein the tail proximal end of the second tail surface is coupled to the fuselage and the tail distal end of the second tail surface is coupled to the second rotor boom; a first plurality of lift rotors positioned on the first rotor boom to produce a first lifting thrust force; and a second plurality of lift rotors positioned on the second rotor boom to produce a second lifting thrust force.

In certain aspects, a cross-member structure may be coupled to each of said first and second rotor booms, wherein the cross-member structure is substantially perpendicular to the said first and second rotor booms.

In certain aspects, the cross-member structure is positioned aft of said first and second wing surfaces.

In certain aspects, the tail distal end of the first tail surface is coupled to the first rotor boom via a cross-member structure, and the tail distal end of the second tail surface is coupled to the second rotor boom via the cross-member structure.

In certain aspects, the cross-member structure is a horizontal stabilizer.

In certain aspects, each of said first rotor boom comprises a first vertical stabilizer and said second rotor boom comprises a second vertical stabilizer.

In certain aspects, the first vertical stabilizer, the second vertical stabilizer, and the horizontal stabilizer are arranged in an H-tail arrangement.

In certain aspects, the first and second tail surfaces are configured at anhedral angles to define, together with the first vertical stabilizer, the second vertical stabilizer, and the horizontal stabilizer, a combination H- and Λ-tail arrangement.

In certain aspects, the first and second canard surfaces and the first and second tail surfaces are configured at anhedral angles.

In certain aspects, the first and second wing surfaces are configured at dihedral angles.

In certain aspects, each of the first plurality of lift rotors and the second plurality of lift rotors employs a propeller consisting of two rotor blades.

In certain aspects, the propeller is arranged with the two rotor blades aligned fore and aft when in a stowed configuration.

In certain aspects, the propeller is automatically arranged in a stowed configuration during cruise flight.

In certain aspects, third and fourth rotor booms may be provided, wherein the third and fourth rotor booms are substantially parallel to the roll axis of the fuselage and outboard relative to the first and second rotor booms.

In certain aspects, the third rotor boom is coupled to the first wing surface and the fourth rotor boom is coupled to the second wing surface.

In certain aspects, the third rotor boom comprises a third plurality of lift rotors and the fourth rotor boom comprises a fourth plurality of lift rotors.

In certain aspects, the first plurality of lift rotors consists of four lift rotors and the second plurality of lift rotors consists of four lift rotors.

In certain aspects, the third plurality of lift rotors consists of two lift rotors and the fourth plurality of lift rotors consists of two lift rotors.

In certain aspects, each of the first and second lifting thrust forces is directed away from the fuselage.

In certain aspects, each of the first and second plurality of lift rotors includes a propeller driven by an electric motor.

In certain aspects, the thrust rotor includes a propeller driven by an electric motor.

In certain aspects, the thrust rotor is coupled to the fuselage.

In certain aspects, the thrust rotor is configured in a pusher propeller configuration.

DESCRIPTION OF THE DRAWINGS

These and other advantages of the present invention may be readily understood with the reference to the following specifications and attached drawings wherein:

FIG. 1b illustrates a bottom perspective view of the VTOL aircraft of FIG. 1a.

FIG. 1c illustrates a top plan view of the VTOL aircraft of FIG. 1a.

FIG. 1d illustrates a bottom plan view of the VTOL aircraft of FIG. 1a.

FIG. 1e illustrates a left side elevation view of the VTOL aircraft of FIG. 1a.

FIG. 1f illustrates a right side elevation view of the VTOL aircraft of FIG. 1a.

FIG. 1g illustrates a front elevation view of the VTOL aircraft of FIG. 1a.

FIG. 1h illustrates a rear elevation view of the VTOL aircraft of FIG. 1a.

FIG. 3b illustrates a bottom plan view of the VTOL aircraft of FIG. 3a.

DETAILED DESCRIPTION

Figure 1A:
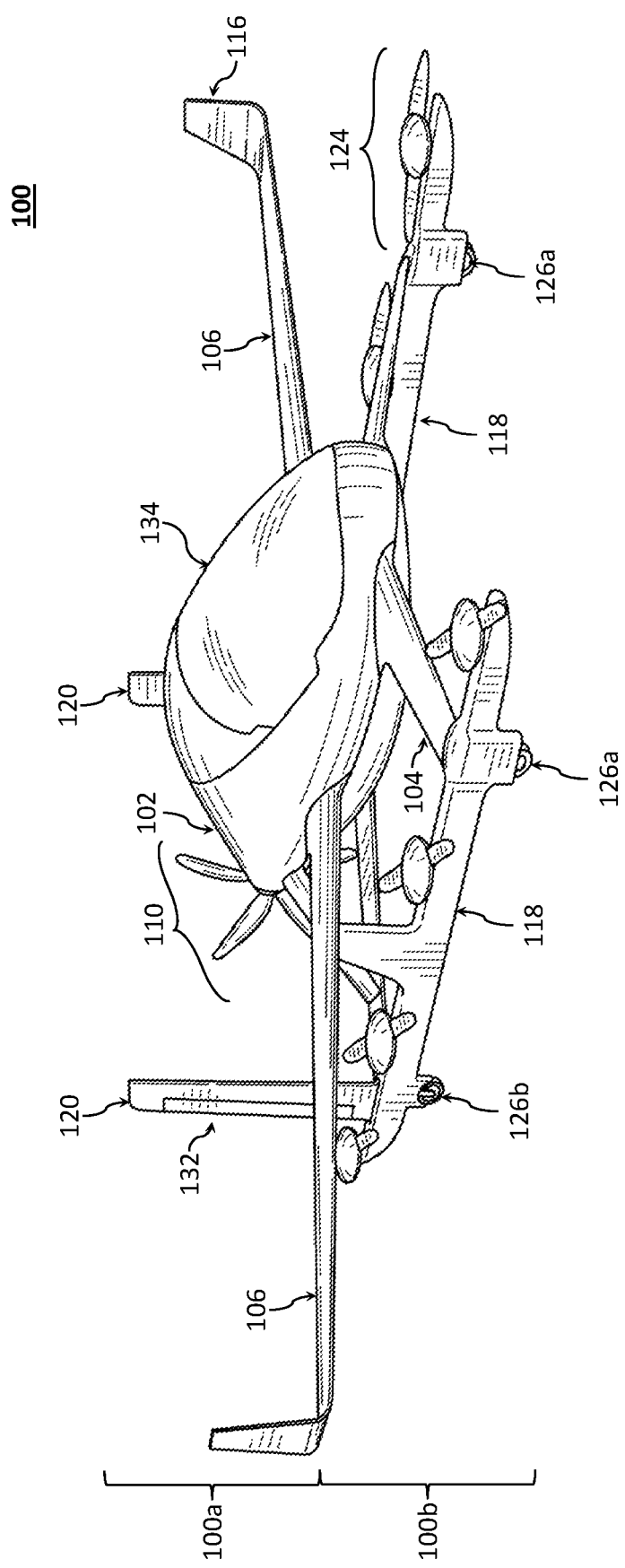
FIG. 1a illustrates a front perspective view of a first example VTOL aircraft.
Figure 1B:
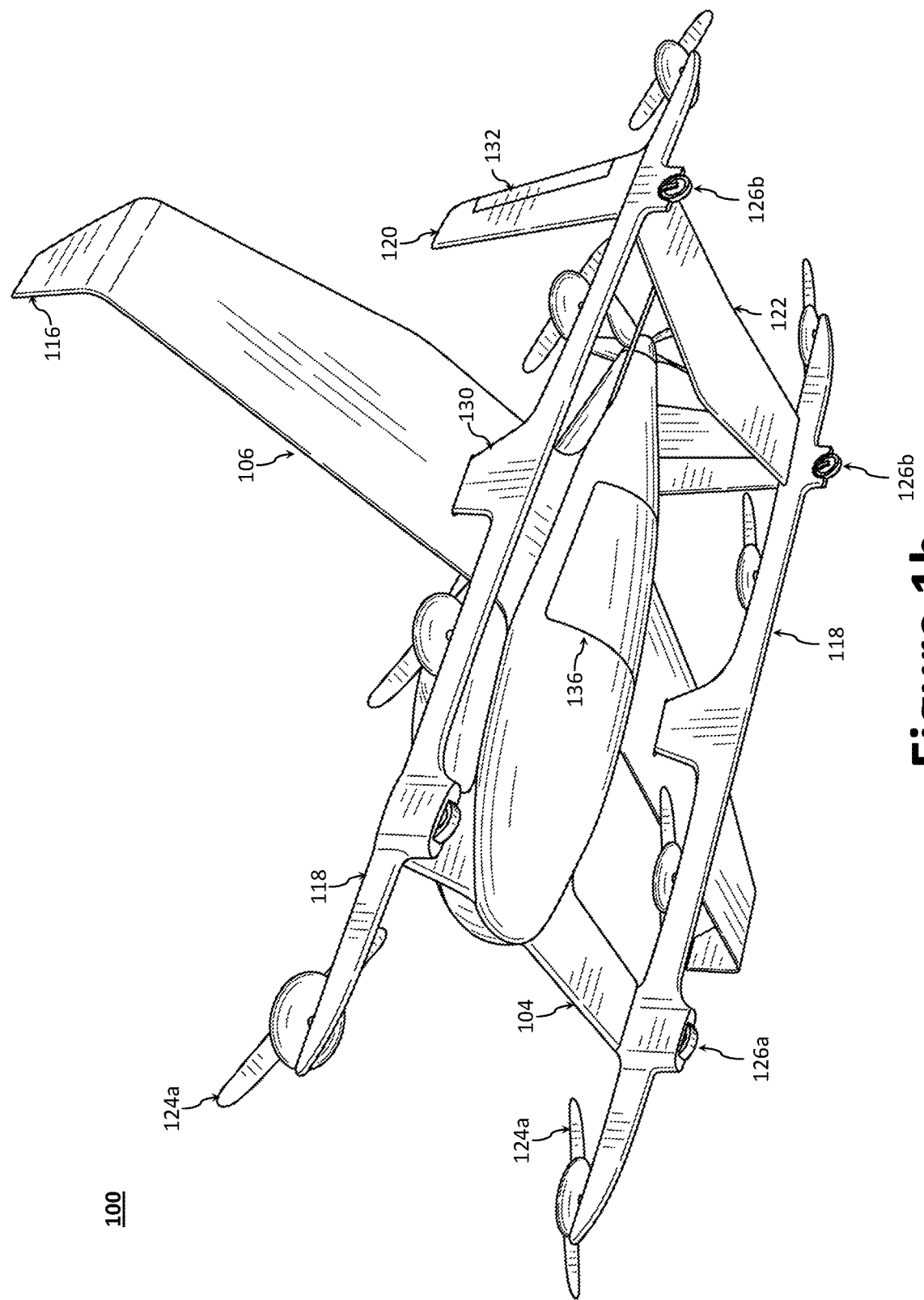

Preferred embodiments of the present invention may be described hereinbelow with reference to the accompanying drawings. In the following description, well-known functions or constructions are not described in detail because they may obscure the invention in unnecessary detail. For this disclosure, the following terms and definitions shall apply.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z".

The terms "aerial vehicle" and "aircraft" refer to a machine capable of flight, including, but not limited to, traditional aircraft and vertical takeoff and landing (VTOL) aircraft.

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "composite material" refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

As utilized herein, the term "exemplary" means serving as a non-limiting example, instance, or illustration. As utilized herein, the terms "e.g." and "for example" set off lists of one or more non-limiting examples, instances, or illustrations.

A number of considerations should be taken into account when designing a small VTOL aircraft. A first consideration is efficiency, which relates to, and dictates, the range of the aircraft. A second consideration is noise, which relates to the total lifting rotor disc area. As will be discussed in detail below, an aircraft configuration with separate lift and propulsion may be employed to increase efficiency, while reducing noise. Third, aircraft with the ability to produce both powered lift and forward thrust must be designed to operate efficiently in the transition region (e.g., transition flight) between vertical flight (e.g., hover flight) and cruise flight (e.g., forward/horizontal/wing-borne flight). Finally, VTOL aircraft should be designed to ensure that the wake from the power lift components (e.g., lift rotors) does not interfere negatively with lifting surfaces to cause a stall condition.

The subject aircraft offers a number of advantages and provides unrivaled performance for the metrics of interest for small VTOL aircraft, such as range, reliability, and noise.

First, the VTOL aircraft offers a stiffer, lighter-weight structure. The rotor booms, which attach the lift rotors to the VTOL aircraft, are secured to the aircraft at three locations (e.g., via canard, primary, and tail wings). This configuration eliminates the need for cantilevers exhibited in other designs, which are prone to vibration and require significant additional structural mass to achieve comparable performance. Indeed, airframe stiffness is particularly important in reducing vibration in aircraft that employ rotors having a spin axis roughly perpendicular to the flight direction, which experience a high airspeed on the advancing blade (tangential speed plus flight speed) and a low airspeed on the retreating blade. In fact, the retreating blade exhibits airflow from the trailing edge to the leading edge near the hub. Because of this airspeed disparately, more lift is generated on the advancing blade, which results in a rolling moment into the aircraft (e.g., via the rotor boom). This cyclical rolling moment going into the rotor boom (or other airframe structure) will excite vibration if the structure is not stiff enough to resist it. Articulated hubs, such as those used on helicopters, are designed to mitigate this rolling moment, but such articulated hubs are complex, unreliable, expensive, heavy, and create drag.

Second, the VTOL aircraft interleaves the rotors and lifting surfaces in the same plane, which requires less power during transition flight between forward flight and hover flight. Interleaving the rotors (e.g., lift rotors) also ensures that the wake from the rotors does not interfere negatively with lifting surfaces (e.g., the canard, primary, and tail wings) to cause a stall condition.

Third, the VTOL aircraft provides more loading flexibility due to higher aerodynamic stability. Specifically, the VTOL aircraft employs three lifting surfaces (canard, primary, and tail wing) to produce a broad range of stable center of gravity positions. This range allows for highly variable loading configurations, reducing the need to balance passenger and cargo weight. As will be shown, the three lifting surfaces connect the fuselage to the rotor booms to form a uniform structure. Finally, the VTOL aircraft enables application of a larger disc area, which reduces hover power and energy requirements and provides better noise performance.

FIGS. 1a through 1h illustrate an exemplary VTOL aircraft 100 with separate lift and forward propulsion systems. As illustrated, the VTOL aircraft 100 generally comprises an upper airframe portion 100a that is coupled to a lower airframe portion 100b. In certain aspects, the upper airframe portion 100a may be removably coupled with the lower airframe portion 100b to more easily enable repair or replacement of either airframe structure, or portion thereof.

Employing separate lift and forward propulsion systems reduces complexity, increases redundancy, and exploits the lift production efficiencies of the primary wings 106. It also allows for the lift and forward propulsion systems to be separately optimized for a specific task, thereby eliminating the requirement for variable pitch rotor blades. As illustrated, the VTOL aircraft 100 employs a forward propulsion system having one or more thrust rotors 110 (i.e., horizontal thrust rotors) to produce a propulsion thrust force acting in the horizontal direction, and a lift system comprising a plurality of lift rotors 124 (i.e., vertical thrust rotors) to produce a lifting thrust force acting in the vertical direction.

The structural components of the VTOL aircraft 100 may be fabricated using materials that are lightweight, with a high specific strength, heat resistant, fatigue load resistant, crack resistant, and/or corrosion resistant. Suitable materials include, for example, composite materials and metals (e.g., aluminum, steel, titanium, and metal alloys). The size and purpose of the VTOL aircraft 100 may dictate the type of materials used. For instance, smaller to midsize aircraft may be more easily fabricated from composite materials, while larger aircraft may warrant metal. Indeed, the internal airframe structure may be a metal, while the body panels (skin) may be fabricated from composite material and/or metal. Metal fittings may be further used to couple or join the various components of the VTOL aircraft 100, whether metal or composite material.

While separate terms are used in the written description to describe the upper airframe portion 100a, the lower airframe portion 100b, and the components thereof, the various functions to be performed do not necessarily have to be performed by separate physical structures. That is, functions of the upper airframe portion 100a and functions of the lower airframe portion 100b can be performed by different structural components of the VTOL aircraft 100, or also by the same structural components of the VTOL aircraft 100. For example, the canard surfaces 104 and tail surfaces 108, which will be described as part of the upper airframe portion 100a, are used, at least in part, to mechanically couple the upper airframe portion 100a to the lower airframe portion 100b and, therefore, may be formed as integral with either or both of the upper and the lower airframe portions 100a, 100b. Similarly, the canard surfaces 104 and tail surfaces 108 may be separate from each of the upper and the lower airframe portions 100a, 100b. Additionally, other structures (e.g., the outer skin of the aircraft) may be shared across multiple structures within the aircraft.

Upper Airframe Portion 100a.

The upper airframe portion 100a generally comprises a fuselage 102, a set of canard surfaces 104 (together defining a canard wing set), a set of primary wings 106 (together defining a primary wing set), a set of tail surfaces 108 (together defining a tail wing set), and at least one thrust rotor 110 to produce thrust with a force vector acting in the horizontal direction.

Fuselage 102.

The fuselage 102 may be a monocoque structure or a semi-monocoque structure, which employs a hybrid combination of tensile stressed skin and a compressive structure made up of longerons and ribs or frames. As illustrated, the fuselage 102 can include a cockpit/cabin 114 for one or more human operators and/or passengers. For example, the illustrated VTOL aircraft 100 is configured to carry 1 to 4 passengers (e.g., about 180 to 750 pounds), plus cargo. The VTOL aircraft 100 may be used as, for example, an air taxi, emergency vehicle (e.g., ambulance), pleasure craft, cargo transport, etc.

The cockpit/cabin 114 may include a forward facing transparent aircraft canopy 134 fabricated from, for example, a glass material, and/or an acrylic material. In certain aspects, however, the aircraft canopy 134 may be configured to provide a substantially unobstructed view to the passengers/pilot (e.g., a 360-degree view to provide forward, rear, side, and upward views). The VTOL aircraft 100 is generally described as having a cockpit for manned operation, but may also be configured as unmanned (i.e., requiring no onboard pilot) or as both unmanned and fully autonomous (i.e., requiring neither an onboard pilot nor a remote control pilot). For example, the VTOL aircraft 100 may be remotely controlled over a wireless communication link by a human operator, computer operator (e.g., remote autopilot), or base station.

The fuselage 102 may further include one or more avionics bays 136 to house cargo, sensors, control systems, etc. While the VTOL aircraft 100 is illustrated as having a fuselage 102 designed to carry passengers, it is contemplated that other airframe structures may be employed to facilitate a particular need or purpose. If the VTOL aircraft 100 is fully autonomous, for example, the airframe structure may be designed to carry only cargo and, to that end, may be sized and shaped to optimize cargo hauling and may further omit passenger centric features, such as the transparent canopy.

Aircraft Control System 200.

Figure 2:
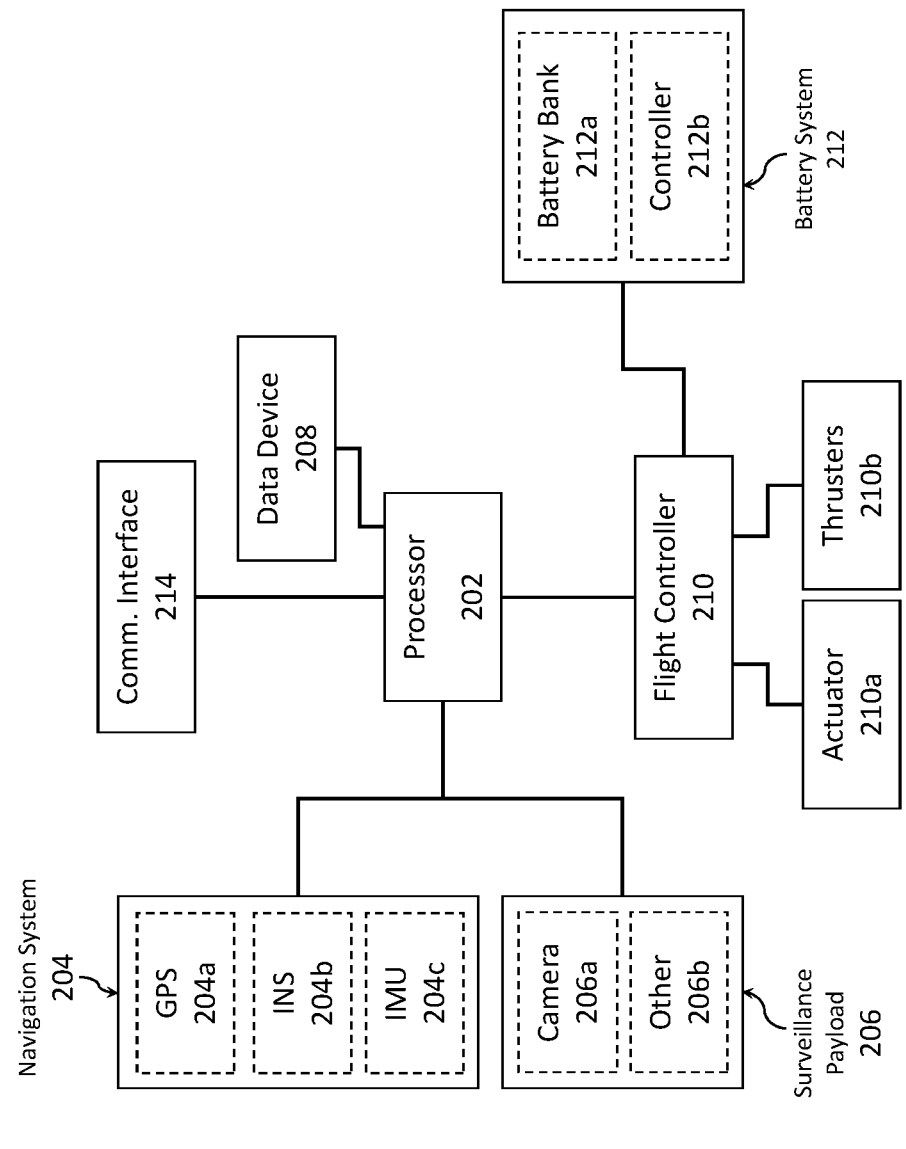
FIG. 2 illustrates a block diagram of an example aircraft control system.

An example aircraft control system 200 is illustrated in FIG. 2. The aircraft control system 200 is configured to control the various aircraft components and functions. To that end, the aircraft control system 200 may include a processor 202, a navigation system 204, a surveillance payload 206, a data storage device 208, a flight controller 210, a battery system 212 (or other power/fuel source), and a communication interface 214. The one or more processors 202 may be configured to perform one or more operations based at least in part on instructions (e.g., software) stored to the onboard data storage device 208 (e.g., hard drive, flash memory, or the like). The aircraft control system 200 may further include other desired services, such as a wireless communication device (e.g., via the communication interface 214).

The navigation system 204 may include an Inertial Navigation System ("INS") 204a that is communicatively coupled with a global positioning system (GPS) 204b and/or an inertial measurement unit (IMU) 204c. The GPS gives an absolute drift-free position value that can be used to reset the INS solution or can be blended with it by use of a mathematical algorithm, such as a Kalman Filter. The intelligence, surveillance, and reconnaissance ("ISR") surveillance payload 206 may be used to collect data and/or monitor an area using a camera 206a or other device 206b.

The flight controller 210 may be operatively coupled to the processor 202 to control operation of the various actuators 210a (e.g., those to control movement of flight surfaces) and/or thrusters 210b (e.g., the thrust rotors 110 and the lift rotors 124) in response to commands from an operator, autopilot, or other high-level system via the communication interface 214. In operation, the flight controller 210 may dynamically (and independently) adjust thrust from each of the lift rotors 124 on each rotor boom 118 during the various stages of flight (e.g., take-off, cruising, landing) to control roll, pitch, or yaw of the VTOL aircraft 100. In other words, the flight controller 210 can independently control each of the lift rotors 124 on a given rotor boom 118 to generate a desired lift thrust for each of the lift rotors 124. For example, when rotors with rotor blades (e.g., propellers) are used, the flight controller 210 may vary the RPM of the rotor and/or, where desired, vary the pitch of the rotor blade. When a wet engine (e.g., gas turbine engine) is used, thrust may be adjusted by controlling (e.g., increasing/decreasing) the fuel flow to the combustion chamber, while an electric motor may be controlled by adjusting power supplied to each electric motor from a battery system 212. The battery system 212 may include a battery bank 212a and a battery controller 212b to manage power flow to aircraft components (e.g., lift rotors 124) or between battery cells within the battery bank 212a. As explained below, the VTOL aircraft 100 may be all-electric aircraft, hybrid, etc. The flight controller 210 may also dynamically and independently adjust thrust from each rotor to increase efficiency during transition. An example control system for operating multiple rotors (e.g., lift-fans) during transition is described by commonly owned U.S. Pat. Pub. No. 2016/0144956 to Robert Parks, entitled "System and Method for Improving Transition Lift-Fan Performance."

Three Lifting Surfaces.

The three lifting surface design creates a large range of viable center of gravity locations, opening the space of loading configurations to allow for variations in number, weight, and distribution of passengers and cargo. Each of the lifting surfaces—flight surfaces, such as the canard surfaces 104, the primary wings 106, and tail surfaces 108—may be coupled to (or integrated with), via their proximal ends, the fuselage 102. The illustrated three-surface design increases the aerodynamic stability margin, allowing for a greater range of loading configurations for lift rotors 124.

During cruise flight, the canard surfaces 104, the primary wings 106, and tail surfaces 108 provide lift to the VTOL aircraft 100 via their airfoil shape. As illustrated, the primary wings 106 may be configured at a dihedral angle (an upward angle from horizontal), while the canard surfaces 104 and tail surfaces 108 may be configured at an anhedral angle (a negative dihedral angle—downward angle from horizontal). In other words, the primary wings 106 may be configured in a "V" configuration, while the canard surfaces 104 and tail surfaces 108 may be shaped like in an inverted V configuration (i.e., "Λ" configuration). The primary wings 106 are illustrated as forward-swept wings to allow for the center of gravity (COG) placement to be closer to aerodynamic center; however, other configurations are contemplated, such as back-swept, tapered, rectangular, elliptical, forward-swept, and the like.

Figure 1C:
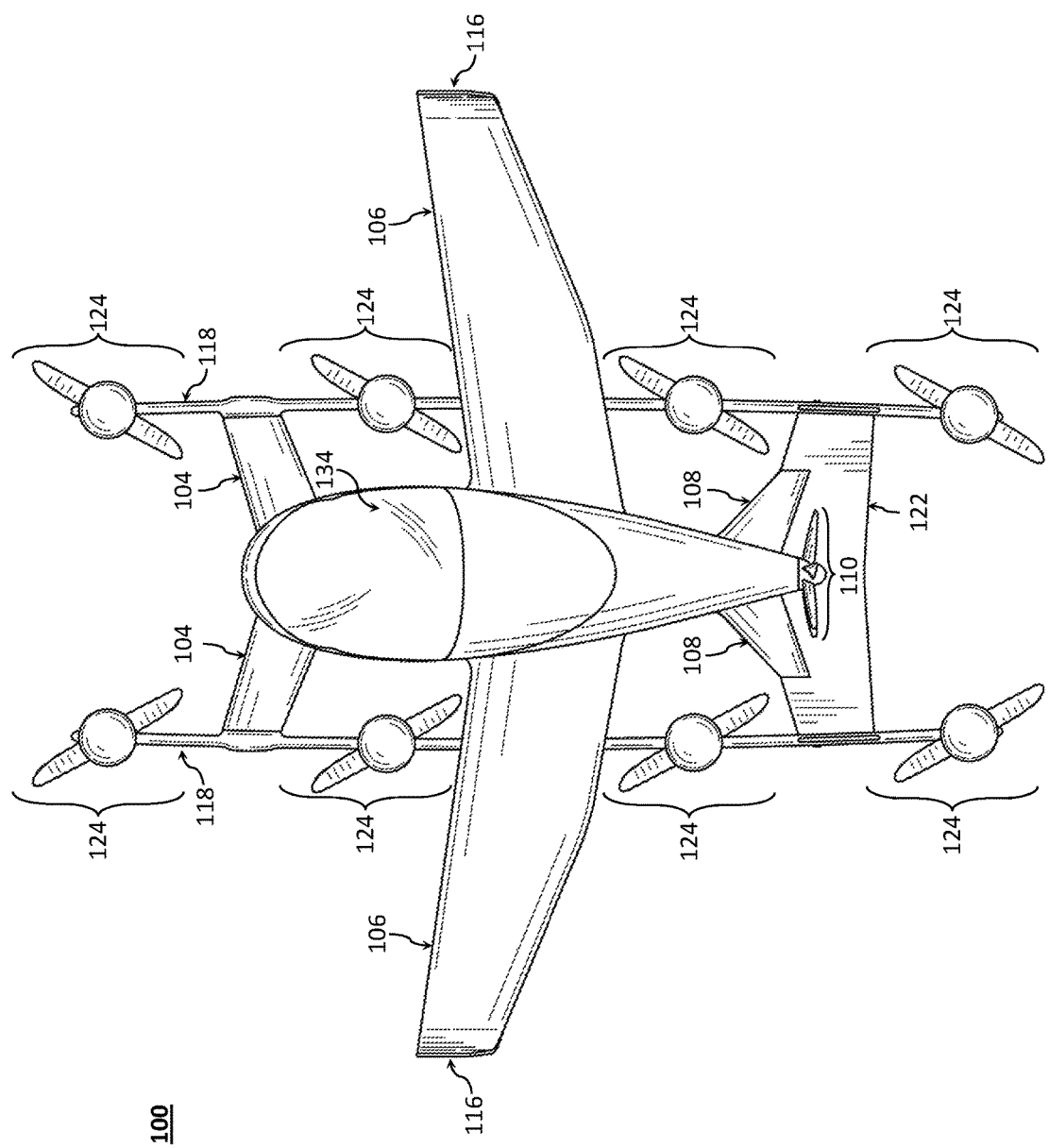
Figure 1D:
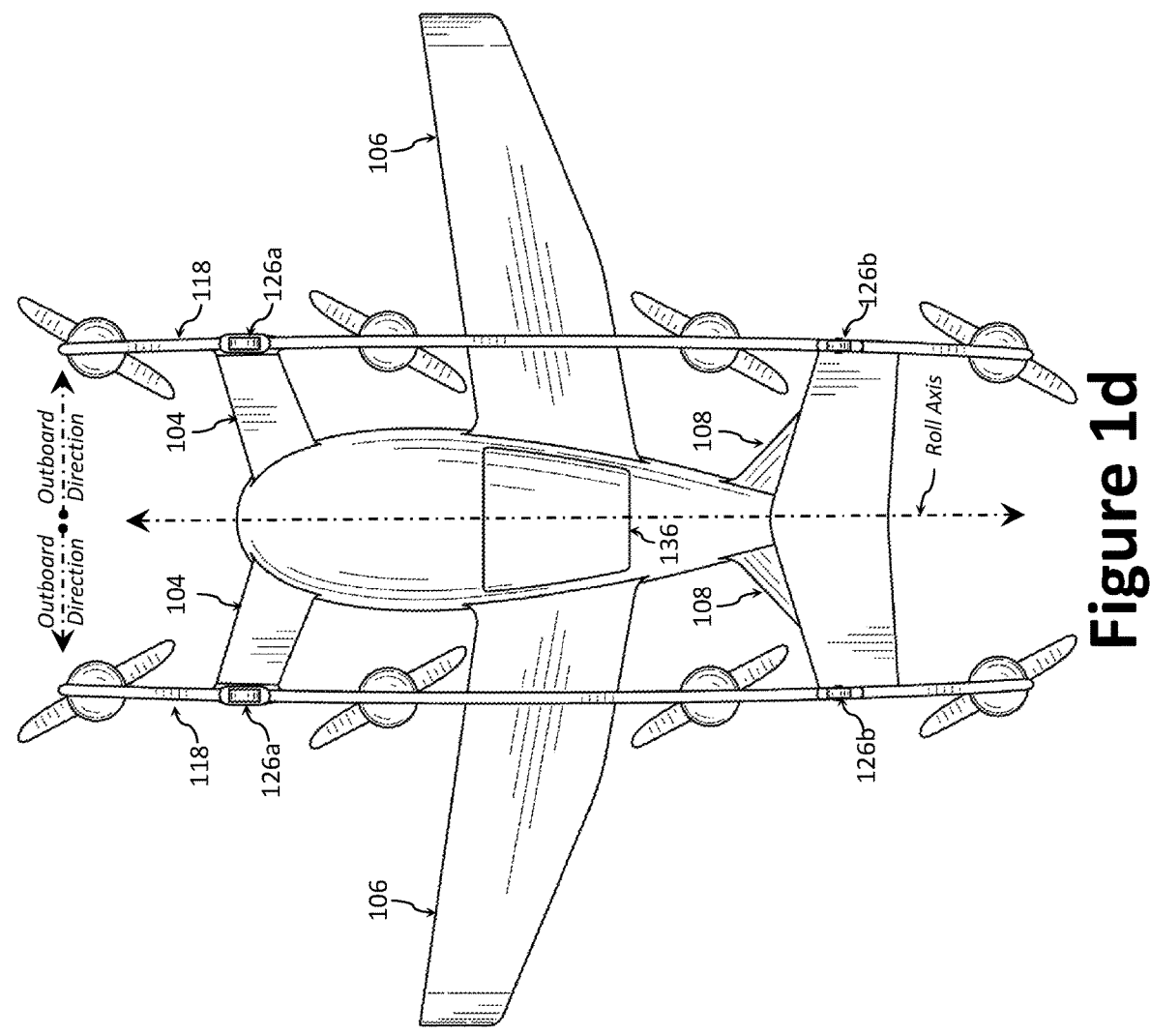
Figure 1E:
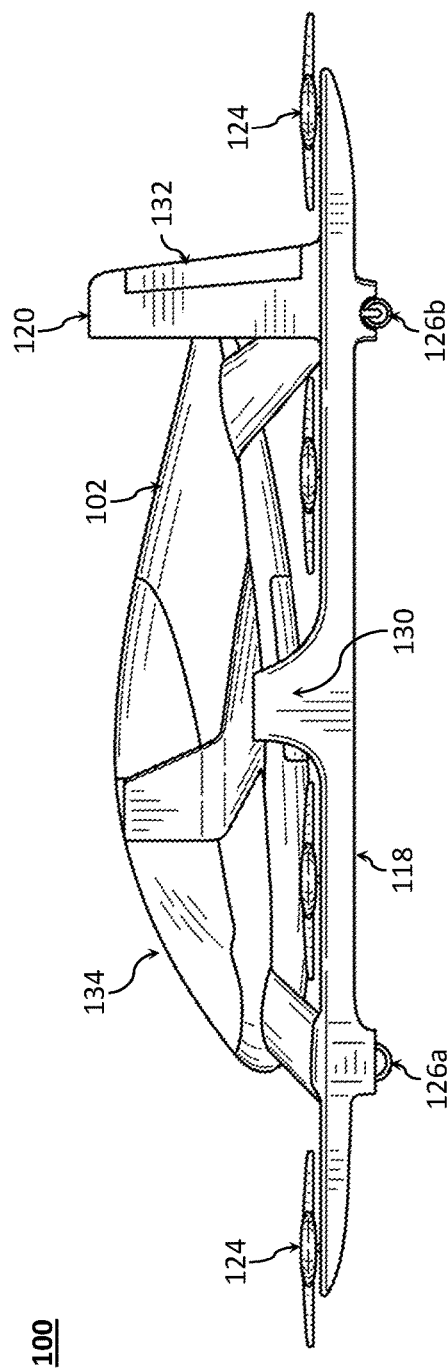
Figure 1F:
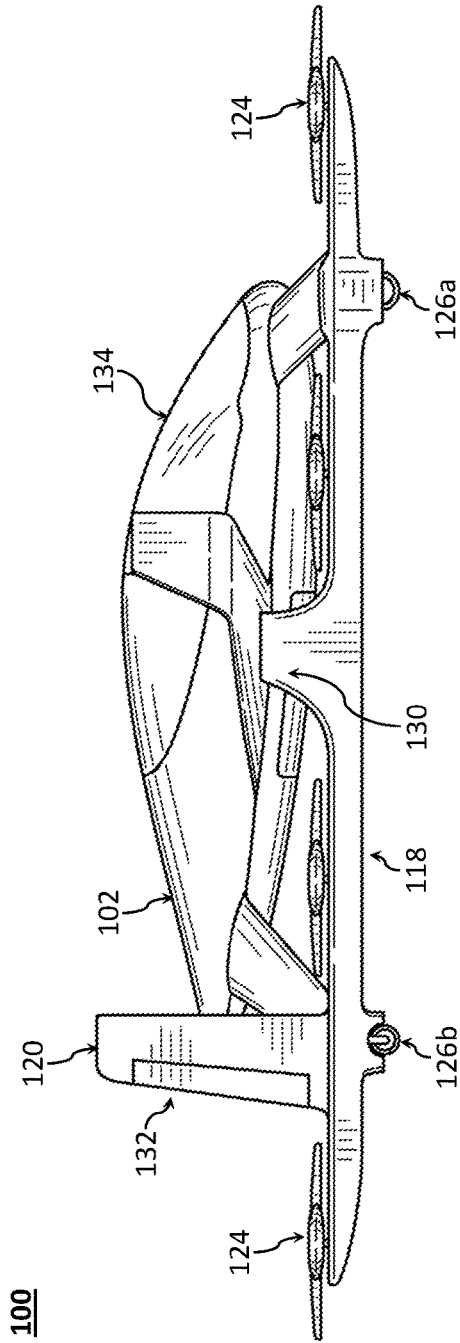

As illustrated, each of the canard surfaces 104, the primary wings 106, and tail surfaces 108 is interleaved to avoid the rotor wake from the lift rotors 124. In other words, when viewed from above (e.g., as illustrated in FIG. 1c), one of the three lifting surfaces 104, 106, 108 is positioned (e.g., coupled, directly or indirectly, to the rotor boom 118) at a point between each of the four lift rotors 124 to mitigate the rotor wake. Specifically, FIG. 1c illustrates where, starting at the forward end (nose end) of the rotor boom 118, the three lifting surfaces 104, 106, 108 and four lift rotors 124 are interleaved in a non-overlapping arrangement such that there is: a first lift rotor 124, the canard surface 104, a second lift rotor 124, the primary wing 106 (which may be coupled to the rotor boom 118 via a wing support structure 130), a third lift rotor 124, the tail surface 108 (which may be coupled to the rotor boom 118 via a horizontal stabilizer 122), and finally, a fourth lift rotor 124. In addition to lift, the three lifting surfaces 104, 106, 108 provide rigidity to the VTOL aircraft 100 by coupling the upper and the lower airframe portions 100a, 100b. As illustrated, the distal end of each primary wing 106 extends upward and beyond the dimensions of the lower airframe portion 100b, while the distal ends of the canard surfaces 104 and tail surfaces 108 extend downward and terminate at (and couple to) the lower airframe portion 100b. The distal end of each primary wing 106 may include a winglet 116 to further improve the efficiency of the VTOL aircraft 100.

Each of the canard surfaces 104, the primary wings 106, and tail surfaces 108 may further comprise one of more control surfaces. As illustrated, each primary wing 106 may, for example, include one or more trailing edge flaps 112 and/or trim tabs. While only the primary wings 106 are illustrated as having control surfaces, it is contemplated that the canard surfaces 104 and tail surfaces 108 may further include control surfaces, such as trailing edge flaps 112 and/or trim tabs. To that end, the canard surfaces 104 and tail surfaces 108 may employ trim tabs to control the trim of the controls to thereby counteract aerodynamic forces and stabilize the VTOL aircraft 100 without the need for the operator to constantly apply a control force. For example, an elevator may be provided on the aft tail surfaces 108 and ailerons on the primary wings 106. The trailing edge flaps 112 may be coupled with the canard, primary, and tail surfaces 104, 106, 108 in accordance with one of more flap configurations, including, for example, plain flaps, slotted flaps, and fowler flaps. While the VTOL aircraft 100 is described as having three lifting surfaces, one of skill in the art would recognize in view of the subject disclosure that additional lifting surfaces may be employed.

Thrust Rotor 110.

The thrust rotor(s) 110 may employ a wet engine (e.g., a gas turbine engine) and/or an electric motor to produce thrust with a force vector acting in the horizontal direction. For example, the thrust rotor 110 may include a propeller 110a (e.g., a central hub with a plurality of rotor blades radiating therefrom) that is driven by a mechanical device, such as an engine or an electric motor (i.e., an electrically-driven propeller). The propeller 110a may include, for example, 4 to 10 rotor blades, or, as illustrated, 6 rotor blades. The propeller 110a may be configured in a pusher propeller configuration (as illustrated) or in a tractor configuration. In a tractor configuration, the propeller is situated forward (at the front) of the fuselage 102. During operation, the thrust rotor 110 may be throttled (e.g., under control of the pilot or flight control system) to produce a desired thrust force acting in the horizontal direction.

Lower Airframe Portion 100b.

As illustrated, the lower airframe portion 100b generally comprises a set of substantially parallel rotor booms 118, a set of vertical stabilizers 120, a horizontal stabilizer 122, and a plurality of lift rotors 124 to produce a lifting thrust with force acting in the vertical direction. In certain aspects, the lower airframe portion 100b may further comprise a set of auxiliary rotor booms 128. While the vertical stabilizers 120 are illustrated as vertical (and parallel to one another), other configurations are possible.

Rotor Booms.

The rotor booms 118 provide a mounting structure for the lift rotors 124, where the structural support afforded by the three attachment points provide rigidity and structural weight efficiency (e.g., via the three attachment points to the canard, wing, and tail lifting surfaces 104, 106, 108). As illustrated, a rotor boom 118 may be positioned on each side of the fuselage 102 to support one or more lift rotors 124 and to support to the upper airframe portion 100a. The rotor booms 118 may be substantially parallel to one another and parallel to the lengthwise axis (roll axis) of the fuselage 102. The rotor booms 118 may be positioned below a plane defined by the lower surface of the fuselage 102. In certain aspects the rotor booms 118 and lift rotors 124 may be arranged to avoid overlap with the fuselage 102, thereby mitigated thrust loss. To that end, the lateral distance between the rotor booms 118 and the fuselage 102 of the VTOL aircraft 100 may be at least the length of the rotor blades. In other aspects, the rotor booms 118 may be positioned closer to the fuselage 102 such that the distal ends of the rotor blades of the propeller 124a extend under the fuselage 102 such that they partially overlap with the fuselage 102 during rotation.

A three-point attachment arrangement provides significant structural advantages that reduce the overall airframe weight and thus improves flight efficiency. As illustrated, each rotor boom 118 is coupled to a canard surface 104 and a primary wing 106 of the upper airframe portion 100a, while the rotor boom 118 is coupled to the tail surface 108 via the horizontal stabilizer 122 (or other cross-member structure to bridge/link the rotor booms 118). Specifically, the canard surfaces 104 and tail surfaces 108 may be coupled to, or formed by, the fuselage 102 and angled downward (anhedral) towards the rotor booms 118, thereby connecting the rotor booms 118 with the fuselage 102. This configuration allows for the rotor booms 118 and the lift rotors 124 to be positioned below the primary wing 106. The mounting arrangement of the lift rotors 124 on the rotor booms 118, between and in the same plane as the lifting surfaces 104, 106, 108, minimizes rotor-wing interference during the transition between vertical flight and cruise flight.

Coupling each rotor boom 118 to the upper airframe portion 100a (e.g., the fuselage 102) at three (or more) spaced locations (e.g., via lifting surfaces 104, 106, 108) provides optimum structural stiffness and mass distribution, such that there is less vibration and higher aeroelastic stability. The structural efficiency afforded by the three-point attachment also reduces the size required for the primary and auxiliary rotor booms 118, 128, thereby decreasing drag and weight. Accordingly, the width of the rotor booms 118 should be minimized to avoid obstructing airflow from the lift rotors 124 during vertical flight, which will also greatly reduce noise generated by the airflow being reflected off the rotor booms 118.

As illustrated, for example, each rotor boom 118 can be directly or indirectly coupled to, or supported by, the upper airframe portion 100a at (or near) rotor boom's 118 distal ends and at a third point positioned therebetween. In certain aspects, the three spaced attachment locations on the rotor boom 118 may be equidistant. Other configurations are contemplated, however. For example, the rotor boom 118 may couple directly to the tail surface 108 without using the horizontal stabilizer 122 or other cross-member structure. Depending on the vertical distance between each rotor boom 118 and an attachment point (e.g., of the primary wing 106), one or more wing support structures 130 may be employed to bridge the gap, such as cabane struts, pylon(s) or pedestal (s). The one or more wing support structures 130 may be integrated with the rotor boom 118.

Each rotor boom 118 may further comprise two or more wheels (e.g., a fixed wheel 126a and a steerable wheel 126b); at least one wheel on each rotor boom 118 is preferably a steerable wheel 126b. In certain aspects, the rotor boom 118 may function as pontoons or floats to enable taking off and landing on water. To that end, the rotor booms 118 may be configured as airtight hollow structures to provide buoyancy to the VTOL aircraft 100 in water. The two or more wheels may be powered by a motor, such as an electric motor.

Rotor Disc Area.

The rotor boom 118 facilitates an increased number of lift rotors 124, thereby providing a large disc area to reduce noise, hover power, and energy use. As illustrated, for example, each rotor boom 118 may support four lift rotors 124, each lift rotor 124 having the same diameter. Alternatively, the rotor boom 118 may be extended to accommodate additional lift rotors 124 of the same diameter. The lift rotors 124 may be sized to meet a particular need. The rotor boom 118 may be sized to employ 2 to 10, more preferably 3 to 6, most preferably 4 lift rotors 124. For example, a VTOL aircraft 100 configured to transport 2 to 4 passengers may employ four 58-inch diameter lift rotors 124 on each rotor boom 118.

In certain aspects, the lift rotors 124 may employ counter-rotation ordering. In order to more closely position the lift rotors 124 on the rotor boom 118, thereby increasing the number of lift rotors 124 on a given length, the sweep of the lift rotor's 124 rotor blades may overlap. Except in embodiments where variable speed or counter rotating rotors are employed, this may be accomplished by meshing the rotor blades such that adjacent rotor blades are out of phase by, for example, 90 degrees relative to one another (when 2 bladed propellers are used). Alternatively, the lift rotors 124 may be tilted or offset. For instance, the lift rotors 124 may be tilted by a predetermined angle (forward or aft).

Figure 3A:
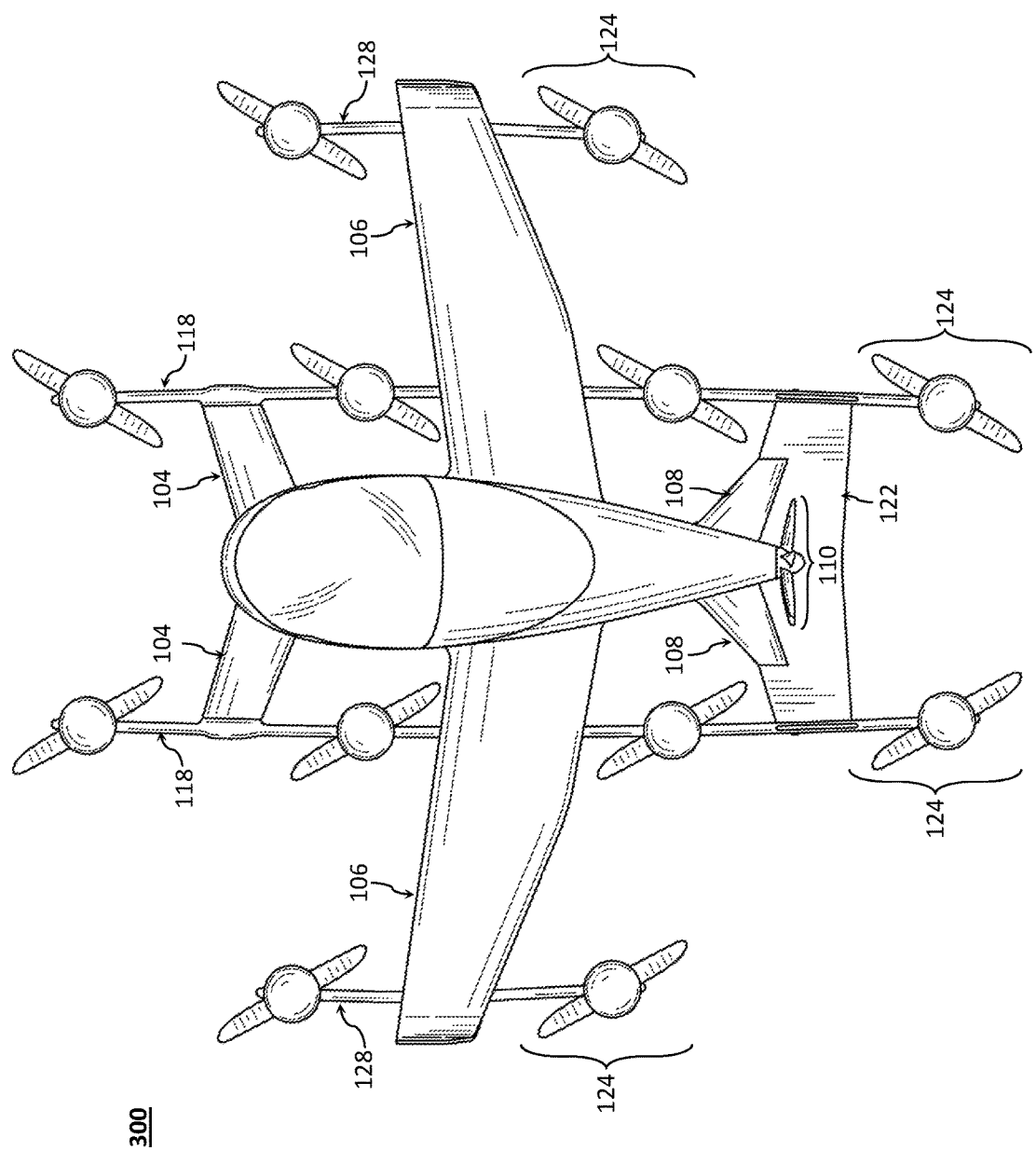
FIG. 3a illustrates a top plan view of a second example VTOL aircraft.
Figure 3B:
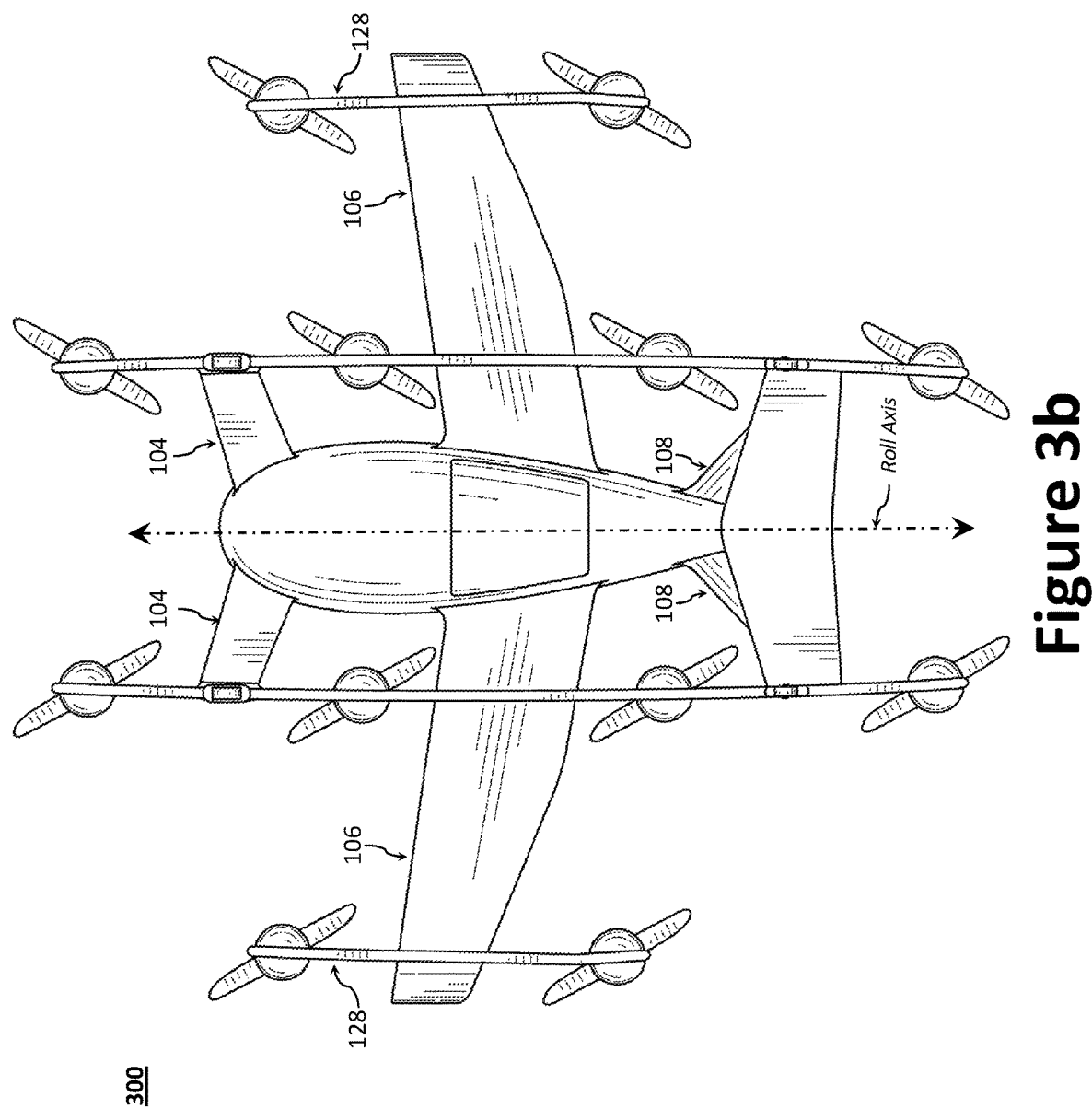

The disc area can be further increased (reduces the disc loading) by adding a second set of booms on each side of the fuselage 102. Accordingly, as illustrated in FIGS. 3a and 3b, a set of auxiliary rotor booms 128 may be employed to provide additional thrust by providing the physical space (e.g., additional rotor attachment points) needed for additional lift rotors 124. The auxiliary rotor booms 128 may be coupled to the primary wings 106 and positioned substantially parallel to one another and/or to the lengthwise axis (roll axis) of the fuselage 102.

As illustrated, the auxiliary rotor booms 128 are positioned outboard relative to the rotor booms 118 (e.g., further away from the roll axis than the "primary" rotor booms 118). The construction of the auxiliary rotor booms 128 is substantially the same as the rotor booms 118, but the size (e.g., length) may be adjusted depending on the desired thrust and aircraft footprint. For example, as illustrated, each auxiliary rotor boom 128 may be sized to mount two additional lift rotors 124 to the VTOL aircraft 100; however, as with the rotor booms 118, the auxiliary rotor booms 128 may be sized or configured to accommodate additional (or fewer) lift rotors 124.

A large number of lift rotors 124 (e.g., about 4 to 16 lift rotors 124, most preferably, about 8 to 12 lift rotors 124) creates a large disc area that reduces the noise output of the design and reduces hover power requirements. In certain aspects, additional auxiliary rotor booms may be provided, which may be aligned with (and parallel to) the first set of auxiliary rotor booms 128 or extending forward (or aft) of the fuselage 102.

Empennage.

Figure 4:
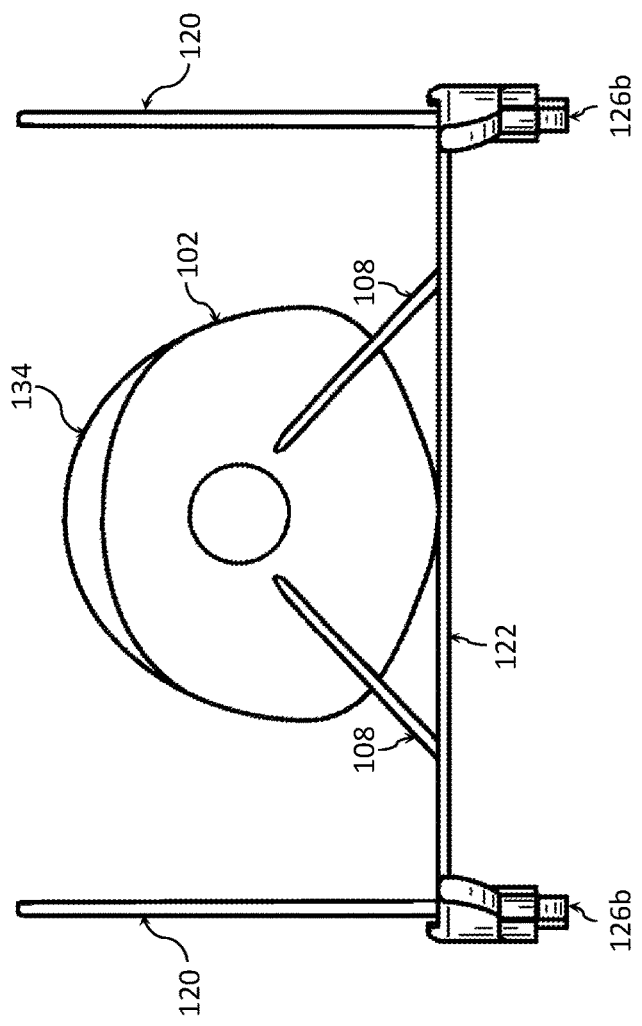
FIG. 4 illustrates a rear elevation view of the empennage with portions of the VTOL aircraft omitted.

The set of vertical stabilizers 120 are positioned substantially perpendicular to the horizontal stabilizer 122 to define a twin tail (H-tail arrangement or U-tail arrangement) empennage. The horizontal stabilizer 122 may be positioned between (and substantially perpendicular to) said rotor booms 118. While the ends of the horizontal stabilizer 122 are illustrated as coupled to the rotor booms 118, the horizontal stabilizer 122 may be configured to extend beyond the rotor booms 118. The horizontal stabilizer 122 can function as an attachment point/interface between the upper and the lower airframe portions 100a, 100b. As illustrated, for example, the Λ-tail surfaces 108 of the upper airframe portion 100a can be coupled to the horizontal stabilizer 122 to provide a combination H- and Λ-tail arrangement. An example combination H- and Λ-tail arrangement 400 is illustrated in FIG. 4, where the canard surface 104, the primary wing 106, and thrust rotor 110 are omitted to better illustrate the combination H- and Λ-tail arrangement 400. As illustrated, the tail surfaces 108 define the Λ-tail portion of the tail arrangement, while the horizontal stabilizer 122 and the vertical stabilizers 120 define the H-tail (or U-tail) portion of the tail arrangement. The existence of an H- or U-tail is dictated by the amount of the vertical stabilizer 120 that extends below the horizontal stabilizer 122.

The vertical stabilizers 120 and the horizontal stabilizer 122 may further comprise one of more control surfaces. For example, each of the vertical stabilizers 120 may include a fixed front section and a movable rudder 132 to direct the nose of the VTOL aircraft 100. The horizontal stabilizer 122 may further comprise one or more trailing edge flaps 112 and/or trim tabs. The trailing edge flaps 112 may be coupled with the horizontal stabilizer 122 in accordance with one of more flap configurations, including, for example, plain flaps, slotted flaps, and fowler flaps.

While the vertical stabilizers 120 and the horizontal stabilizer 122 are arranged to provide a twin tail empennage, other configurations are contemplated, including a "T-", "Pi-"/"π-", "X-", "V-", and "Λ-" arrangements. In certain aspects, one or more of the vertical stabilizers 120 and the horizontal stabilizer 122 may be all moving and/or fuselage- or wing-mounted.

Lift Rotors 124.

Each lift rotors 124 includes a propeller 124a driven by a mechanical device, such as an electric motor. The lift rotors 124 are coupled to the rotor boom 118 with an axis of rotation that is fixed and substantially vertical. As illustrated in FIG. 1g, however, each of the lift rotors 124 may be tilted and arranged on the rotor boom 118 such that each of the propellers generate a thrust having a substantially vertical vector that is directed away from the fuselage 102 (e.g., directions $A_1$ and $A_2$, which are about 5 to 15 degrees outward from the vertical axis). Tilting the lift rotors 124 to generate thrust vectors that are directed away (outward) from the fuselage 102 provides for increased stability during vertical flight. In addition, tilting the lift rotors 124 provides a horizontal component to lift thrust vector, which can be used to control yaw of the VTOL aircraft 100. The spin direction of the lift rotors 124 may further be configured such that motor torque changes produce a yaw moment in the same direction. Moreover, as illustrated, the tilting angle defines a rotor plane that passes entirely below the fuselage 102, which reduces noise and improves safety in the event a lift rotor 124 fails and ejects a rotor blade.

To increase efficiency, the lift rotors 124 may be powered only when necessary (e.g., during the vertical portion of the flight profile—vertical flight and a portion of transition flight), after which the lift rotors 124 may be shut off. While not required for this design, the propeller may further employ variable pitch rotor blades where blade pitch may be controlled, for example, by a swashplate connected to the flight controller 210.

The lift rotors 124 may be designed for low noise during vertical, transition, and cruise flight. The shape and profile of the blades/propellers used for the lift rotors 124 may be designed for low noise during operation (e.g., during vertical flight). For example, the propeller may consist of two rotor blades to provide a high degree of efficiency and low imbalance. The lift rotors 124 may be designed with low drag characteristics to yield a very low drag penalty, thereby obviating any need to fold or stow the lift rotors 124 or propellers 124a within a rotor boom 118.

Figure 5:
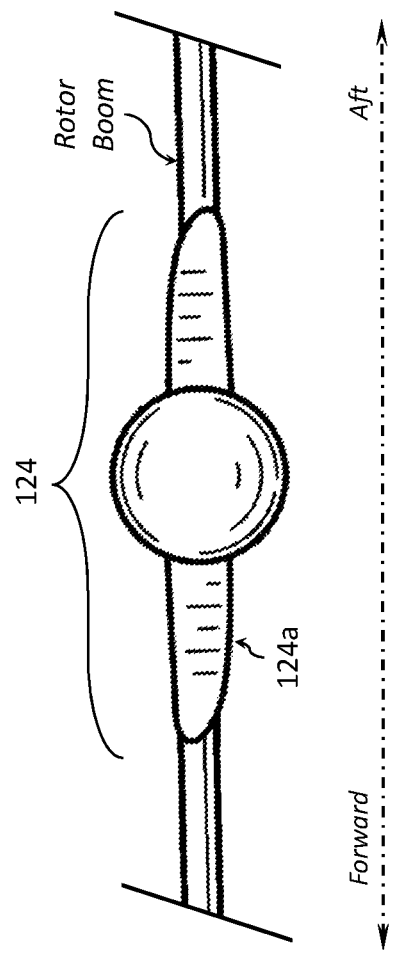
FIG. 5 illustrates a lift rotor stowed in an example fore and aft arrangement.

When not in use, the propellers 124a may be arranged in a stowed configuration where the rotor blades are parallel to the airflow/airstream, thereby minimizing drag during forward flight. Specifically, the rotors may be secured in an orientation that minimizes the air resistance and drag of the rotor blades during cruise flight. In other words, each rotor blade may be positioned in a fore and aft arrangement such that its longitudinal length is parallel to the longitudinal length (roll axis) of the fuselage 102. FIG. 5 illustrates a lift rotor 124 stowed in an example fore and aft arrangement 500 relative to the rotor boom 118, 128. For example, when a propeller with two rotor blades is used, the propeller can be arrested and arranged with the rotor blades aligned fore and aft, and thus parallel with the fuselage 102 (and the rotor booms 118, 128). In certain aspects, upon reaching cruise flight (or upon reaching a predetermined air speed), the propellers 124*a* may be automatically arrested and arranged in a fore and aft arrangement and/or stowed configuration.

As one of skill in the art would appreciate, the VTOL aircraft 100 can be scaled up, or down to facilitate a particular purpose based on, for example, flight objective and/or flight plan. Moreover, while the VTOL aircraft 100 is described as having a thrust rotor 110 and lift rotors 124 that employ electrically-driven propellers 124*a*, various propulsion types are contemplated. In certain aspects, the VTOL aircraft 100 is an all-electric aircraft, whereby a rechargeable battery bank (e.g., via battery system 212) is used to power one or more electric motors to generate thrust. In another aspect, the VTOL aircraft 100 may be a hybrid aircraft where a wet engine (e.g., a gas turbine engine) is used to generate electricity (via a generator) to power one or more electric motors to generate thrust, in which case a battery bank is provided to store power from the generator. In yet another aspect, the VTOL aircraft uses a hybrid of turbine and electric thrusting. For example, a primary engine may be configured as the thrust rotor to produce thrust for forward flight, while electrically-driven fans are used to generate lift. An example hybrid turbine electric thrusting system is described by commonly owned U.S. Pat. No. 7,857,254 to Robert Parks, entitled "System and Method for Utilizing Stored Electrical Energy for VTOL Aircraft Thrust Enhancement and Attitude Control."

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations can be ascertainable to those of skill in the art. Thus, it is to be understood that the invention may therefore be practiced otherwise than as specifically described above.

What is claimed is:

1. A vertical take-off and landing (VTOL) aircraft comprising:
a fuselage having a roll axis;
a thrust rotor to produce a propulsion thrust;
first and second rotor booms, wherein the first and second rotor booms are substantially parallel to the roll axis of the fuselage, and the fuselage is positioned between the first and second rotor booms;
first and second canard surfaces, each of said first and second canard surfaces having a canard proximal end and a canard distal end, wherein the canard proximal end of the first canard surface is coupled to the fuselage and the canard distal end of the first canard surface is coupled to the first rotor boom, wherein the canard proximal end of the second canard surface is coupled to the fuselage and the canard distal end of the second canard surface is coupled to the second rotor boom;
first and second wing surfaces, each of said first and second wing surfaces having a wing proximal end and a wing distal end, wherein the wing proximal end of each of the first wing surface and second wing surface is coupled to the fuselage, wherein the first wing surface is coupled to the first rotor boom and the second wing surface is coupled to the second rotor boom;
a cross-member structure having a first cross-member end and a second cross-member end, wherein the first cross-member end is coupled to the first rotor boom and the second cross-member end is coupled to the second rotor boom;
first and second tail surfaces, each of said first and second tail surfaces having a tail proximal end and a tail distal end, wherein the tail proximal end of the first tail surface is coupled to the fuselage and the tail distal end of the first tail surface is coupled to the cross-member structure, wherein the tail proximal end of the second tail surface is coupled to the fuselage and the tail distal end of the second tail surface is coupled to the cross-member structure;
a first plurality of lift rotors positioned on the first rotor boom to produce a first lifting thrust force; and
a second plurality of lift rotors positioned on the second rotor boom to produce a second lifting thrust force.

2. The VTOL aircraft of claim 1, wherein the cross-member structure defines a length that is substantially perpendicular to the said first and second rotor booms.

3. The VTOL aircraft of claim 1, wherein the cross-member structure is positioned aft of said first and second wing surfaces.

4. The VTOL aircraft of claim 1, wherein the first and second tail surfaces are configured at anhedral angles.

5. The VTOL aircraft of claim 1, wherein the first and second plurality of lift rotors are automatically arranged in a stowed configuration during cruise flight.

6. The VTOL aircraft of claim 1, wherein the first plurality of lift rotors consists of four lift rotors and the second plurality of lift rotors consists of four lift rotors.

7. The VTOL aircraft of claim 1, wherein each of the first and second plurality of lift rotors is tilted such that each of the first and second lifting thrust forces is directed outward from the fuselage.

8. The VTOL aircraft of claim 1, wherein the thrust rotor is coupled to the fuselage.

9. The VTOL aircraft of claim 1, wherein the thrust rotor is configured in a pusher propeller configuration.

10. The VTOL aircraft of claim 1, wherein the first and second canard surfaces and the first and second tail surfaces are configured at anhedral angles.

11. The VTOL aircraft of claim 10, wherein the first and second wing surfaces are configured at dihedral angles.

12. The VTOL aircraft of claim 1, wherein each of the first plurality of lift rotors and the second plurality of lift rotors employs a propeller consisting of two rotor blades.

13. The VTOL aircraft of claim 12, wherein the propeller is arranged with the two rotor blades aligned fore and aft when in a stowed configuration.

14. The VTOL aircraft of claim 1, wherein each of the first and second plurality of lift rotors include a propeller driven by an electric motor.

15. The VTOL aircraft of claim 14, wherein the thrust rotor includes a propeller driven by an electric motor.

16. The VTOL aircraft of claim 1, wherein the cross-member structure is a horizontal stabilizer.

17. The VTOL aircraft of claim 16, wherein said first rotor boom comprises a first vertical stabilizer and said second rotor boom comprises a second vertical stabilizer.

18. The VTOL aircraft of claim 17, wherein a first end of the horizontal stabilizer is coupled to the first vertical stabilizer and a second end of the horizontal stabilizer is coupled to the second vertical stabilizer.

19. The VTOL aircraft of claim 1, comprising third and fourth rotor booms, wherein the third and fourth rotor booms are substantially parallel to the roll axis of the fuselage and outboard relative to the first and second rotor booms.

20. The VTOL aircraft of claim 19, wherein the third rotor boom is coupled to the first wing surface and the fourth rotor boom is coupled to the second wing surface.

21. The VTOL aircraft of claim 19, wherein the third rotor boom comprises a third plurality of lift rotors and the fourth rotor boom comprises a fourth plurality of lift rotors.

22. The VTOL aircraft of claim 21, wherein the third plurality of lift rotors consists of two lift rotors and the fourth plurality of lift rotors consists of two lift rotors.

23. A vertical take-off and landing (VTOL) aircraft comprising:
a fuselage defining a roll axis;
a thrust rotor to produce a propulsion thrust;
first and second rotor booms, wherein the first and second rotor booms are substantially parallel to the roll axis of the fuselage, and the fuselage is positioned between the first and second rotor booms;
first and second canard surfaces, each of said first and second canard surfaces having a canard proximal end and a canard distal end, wherein the canard proximal end of the first canard surface is coupled to the fuselage and the canard distal end of the first canard surface is coupled to the first rotor boom, wherein the canard proximal end of the second canard surface is coupled to the fuselage and the canard distal end of the second canard surface is coupled to the second rotor boom;
first and second wing surfaces, each of said first and second wing surfaces having a wing proximal end and a wing distal end, wherein the wing proximal end of each of the first wing surface and second wing surface is coupled to the fuselage, wherein the first wing surface is coupled to the first rotor boom and the second wing surface is coupled to the second rotor boom;
first and second tail surfaces, each of said first and second tail surfaces having a tail proximal end and a tail distal end, wherein the tail proximal end of the first tail surface is coupled to the fuselage and the tail distal end of the first tail surface is coupled to the first rotor boom, wherein the tail proximal end of the second tail surface is coupled to the fuselage and the tail distal end of the second tail surface is coupled to the second rotor boom;
a first plurality of lift rotors positioned on the first rotor boom to produce a first lifting thrust force; and
a second plurality of lift rotors positioned on the second rotor boom to produce a second lifting thrust force,
wherein each of the first and second plurality of lift rotors is tilted such that each of the first and second lifting thrust forces is directed outward from the fuselage.

\* \* \* \* \*